Figure 1:
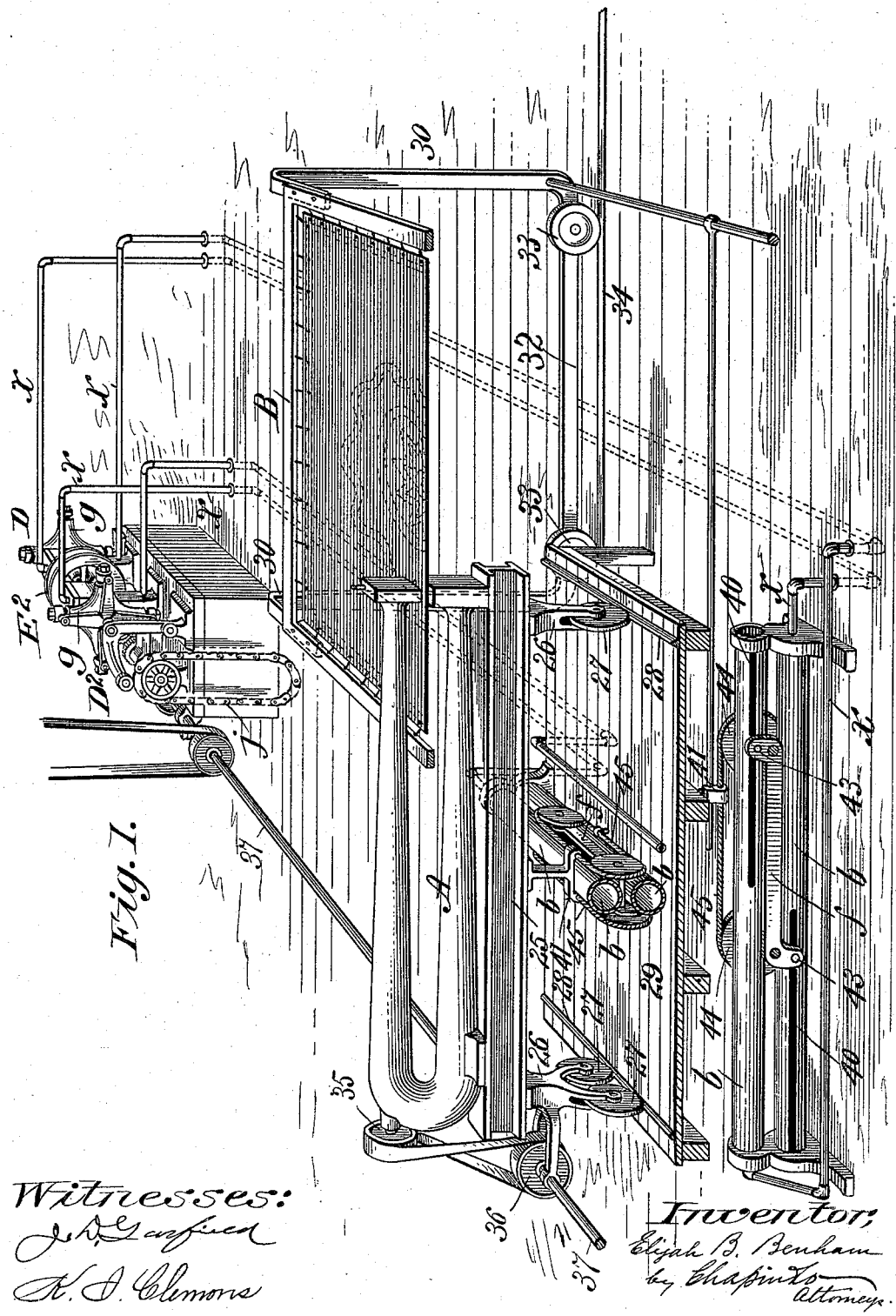

(No Model.) 9 Sheets—Sheet 1.

E. B. BENHAM.
DESIGNING ENGINE.

No. 537,798. Patented Apr. 16, 1895.

Witnesses:
J. D. Garfield
K. J. Clemons

Inventor:
Elijah B. Benham
by Chapin &c.
Attorneys.

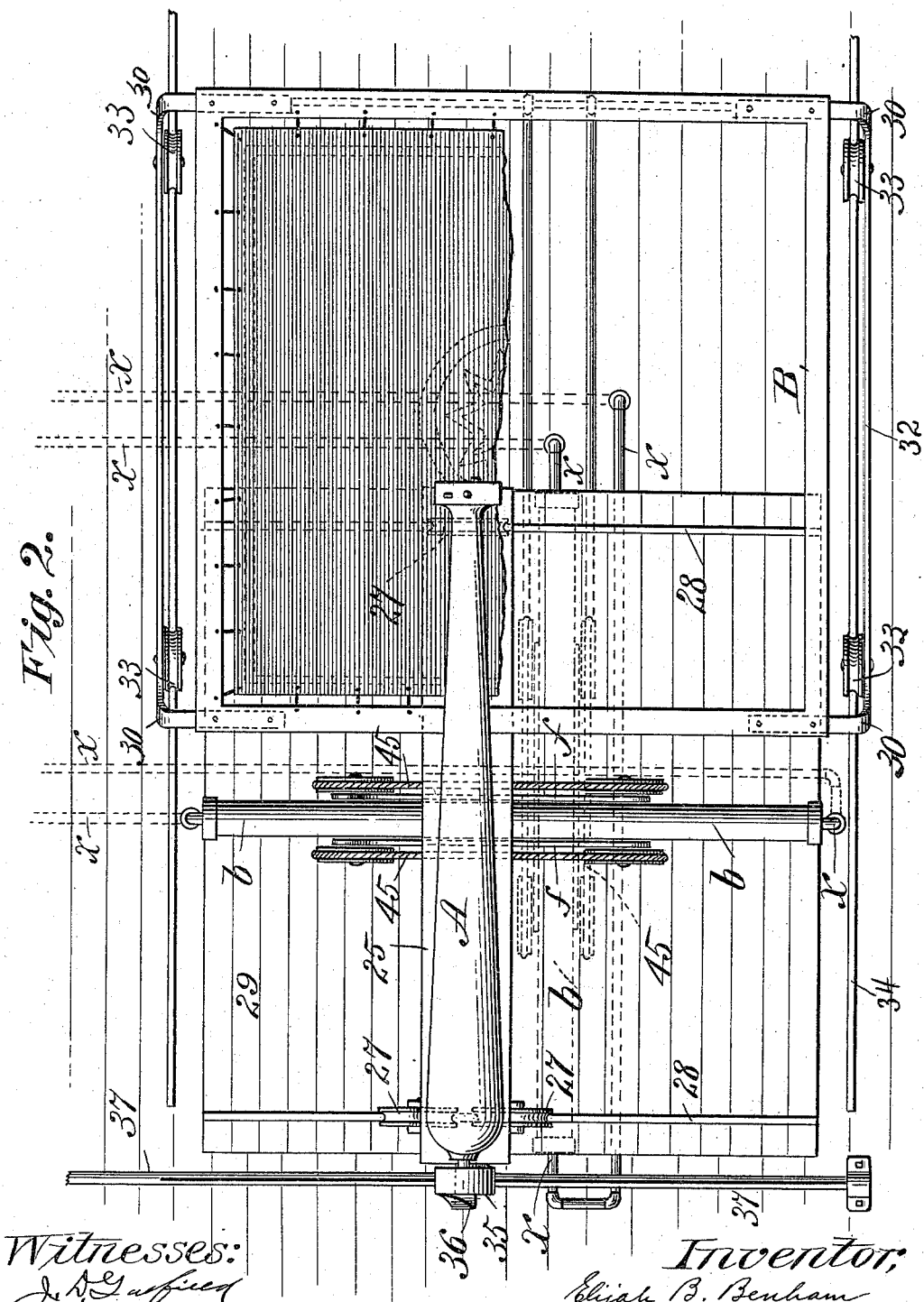

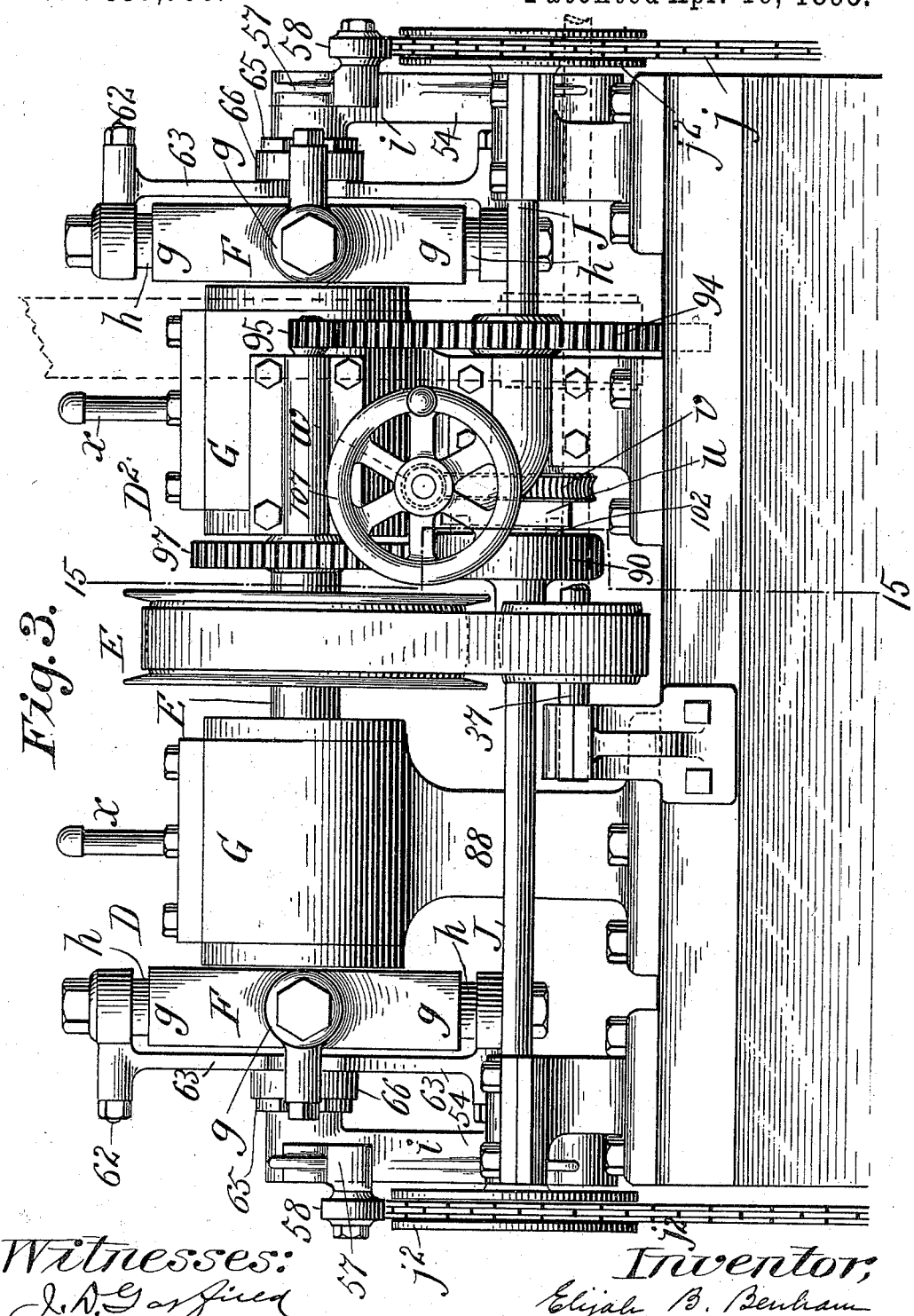

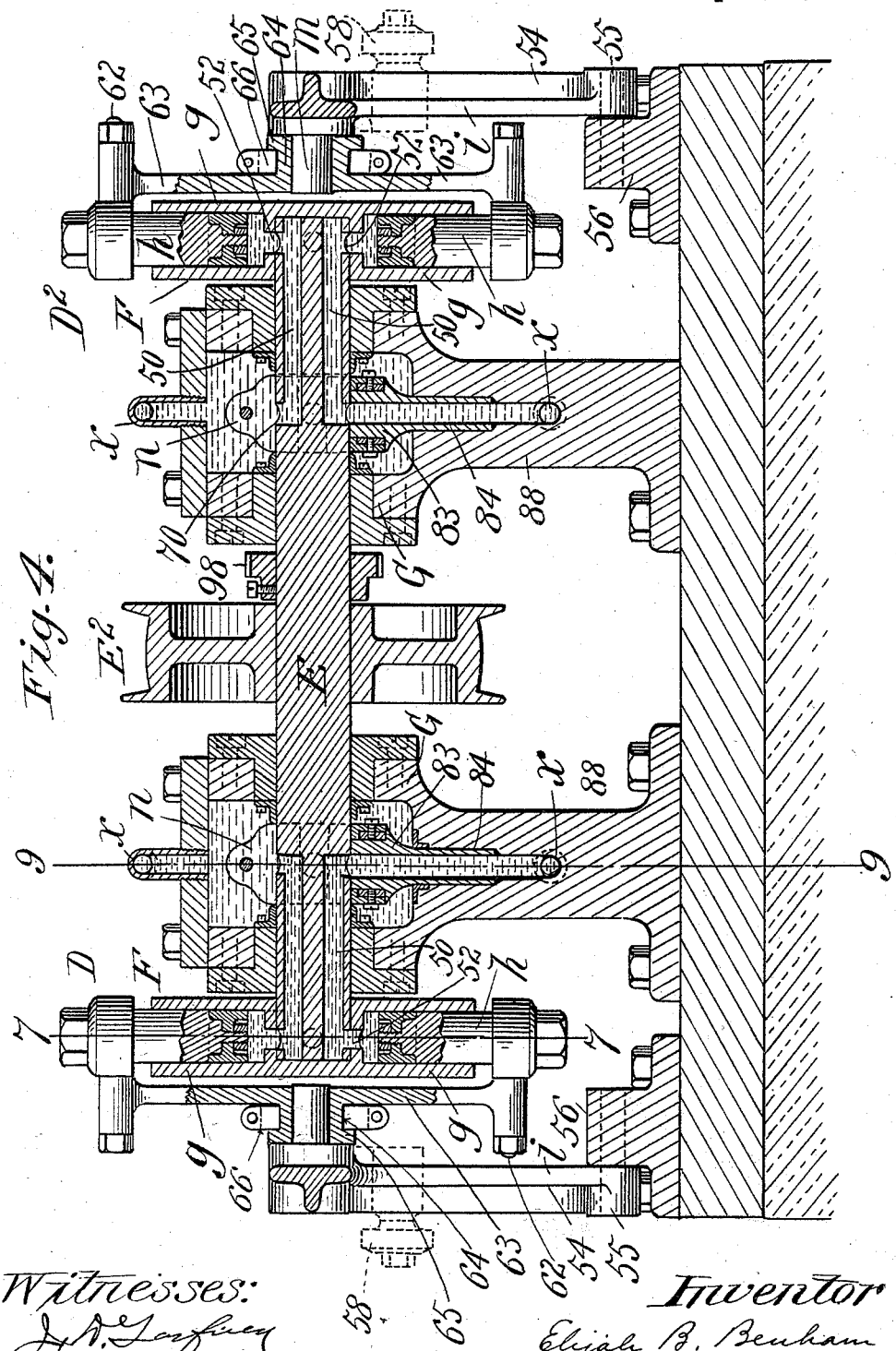

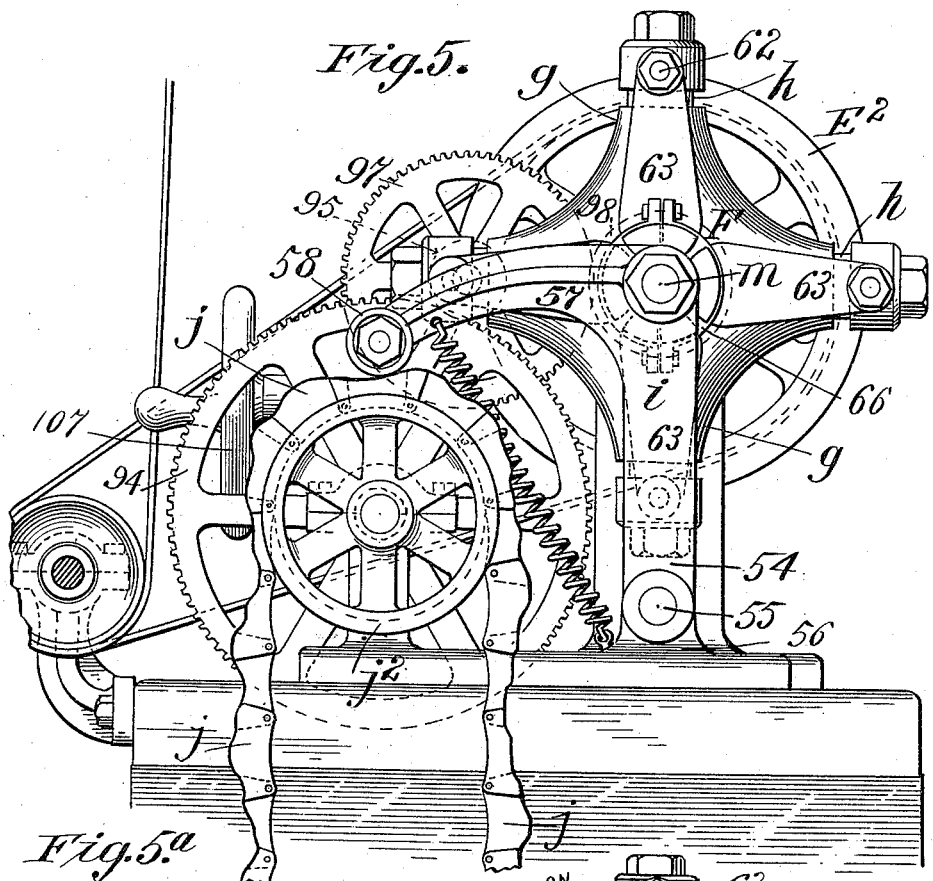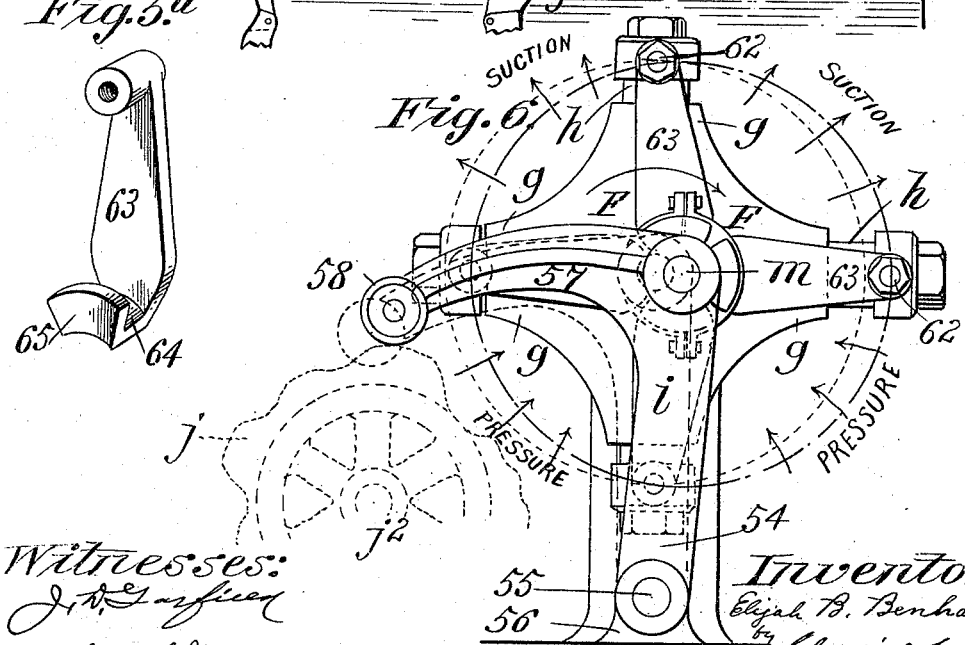

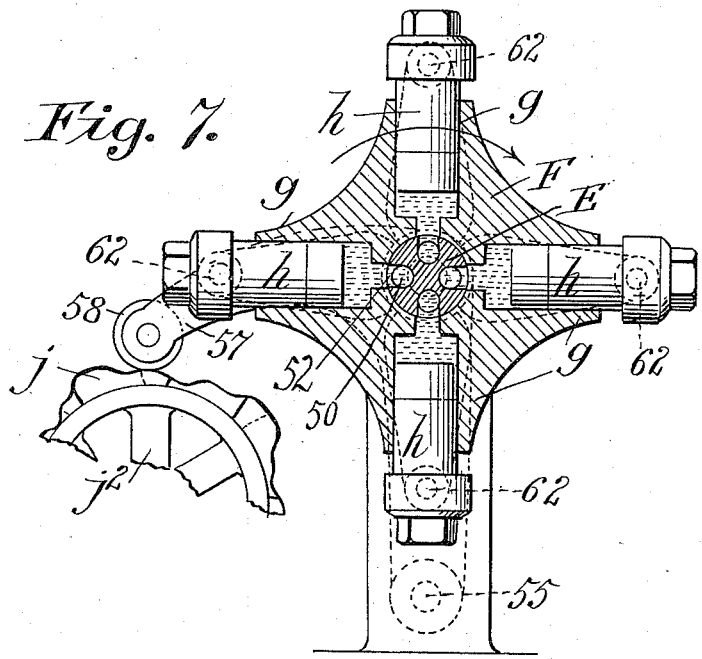

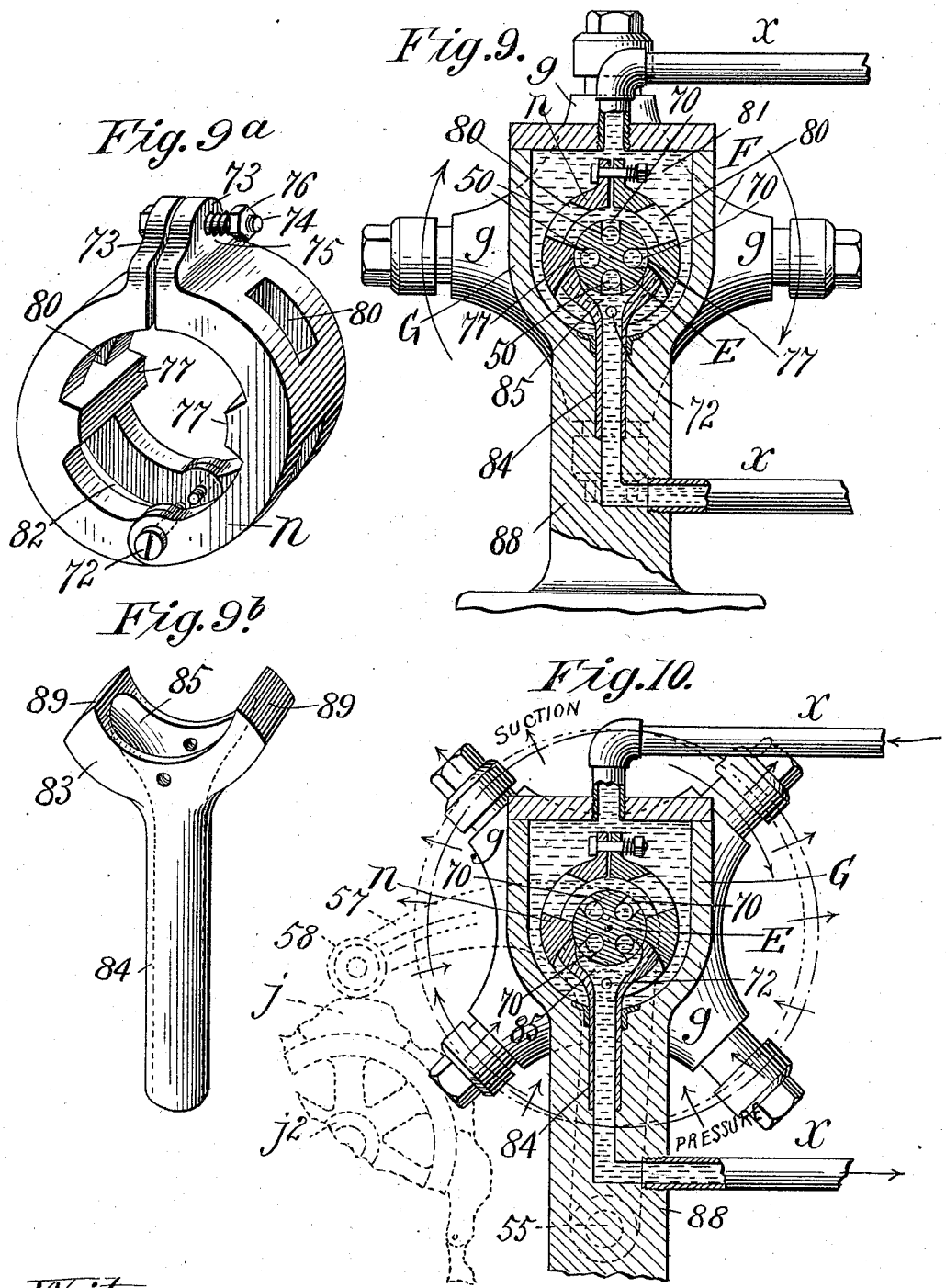

(No Model.) 9 Sheets—Sheet 8.
E. B. BENHAM.
DESIGNING ENGINE.
No. 537,798. Patented Apr. 16, 1895.
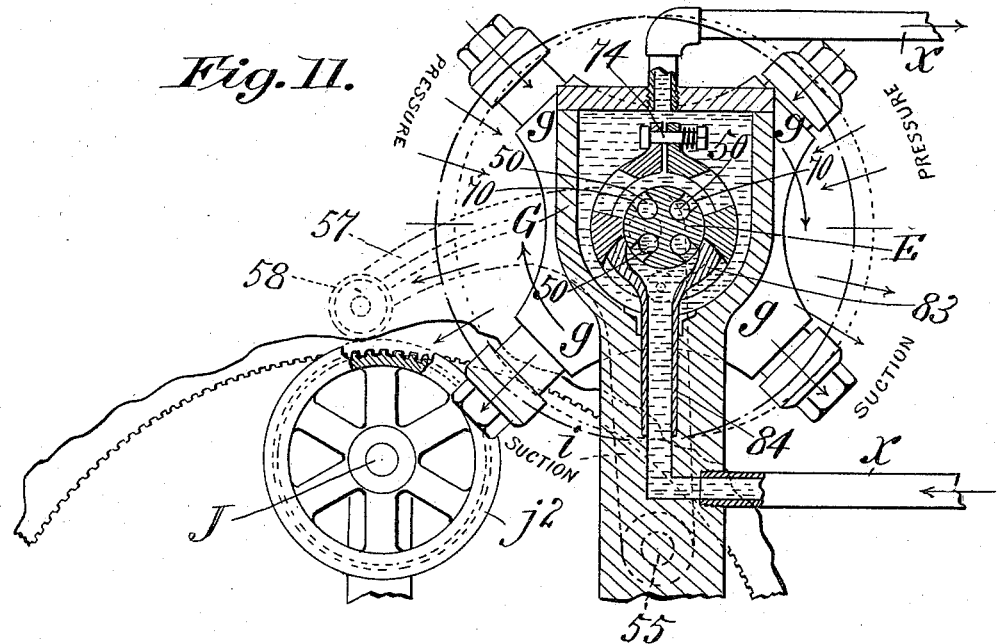
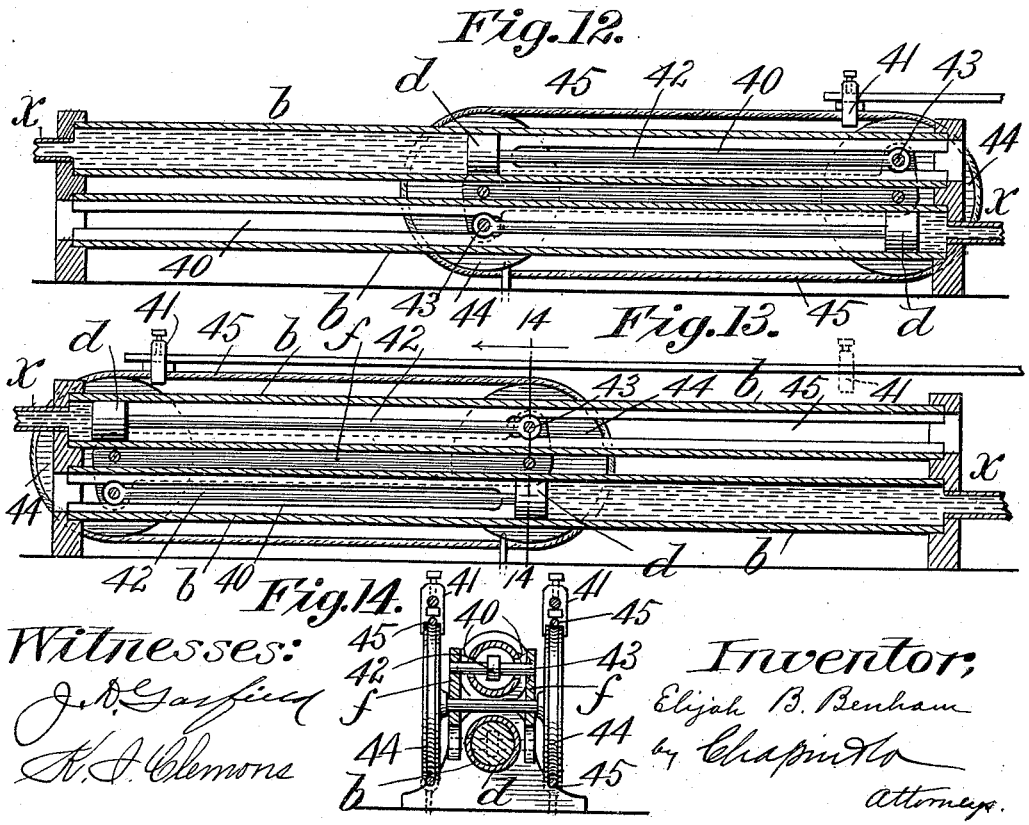
Witnesses:
J. D. Garfield
H. J. Clemons
Inventor:
Elijah B. Benham
by Chapin &co.
Attorneys.

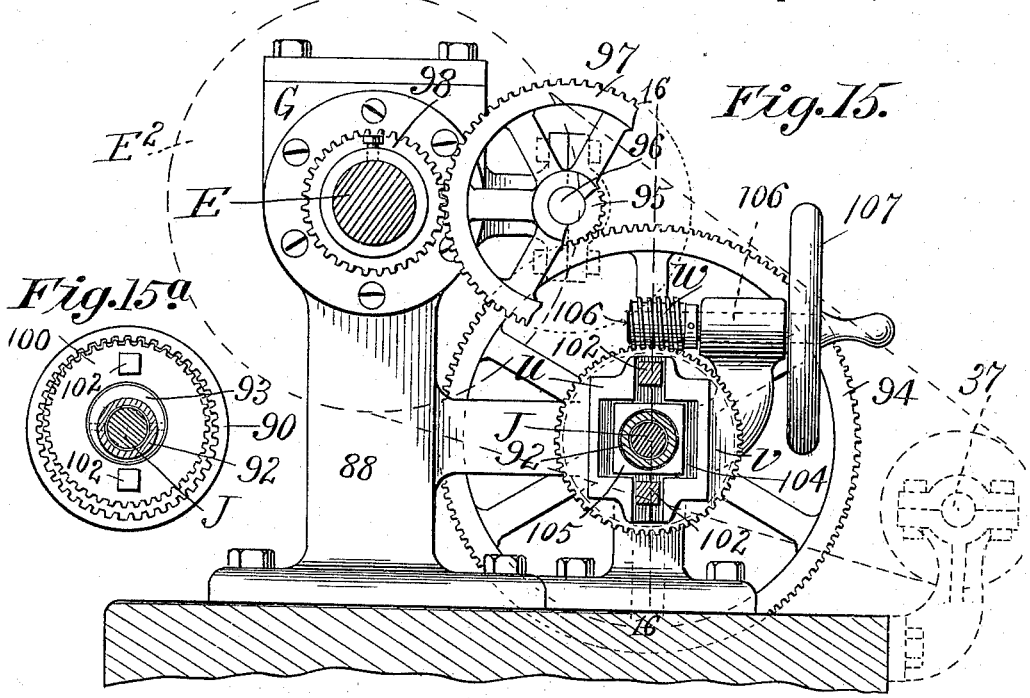
(No Model.) 9 Sheets—Sheet 9.
E. B. BENHAM.
DESIGNING ENGINE.
No. 537,798. Patented Apr. 16, 1895.

UNITED STATES PATENT OFFICE.

ELIJAH B. BENHAM, OF MYSTIC, CONNECTICUT, ASSIGNOR OF ONE-HALF TO QUINCY McGUIRE, OF SAME PLACE.

DESIGNING-ENGINE.

SPECIFICATION forming part of Letters Patent No. 537,793, dated April 16, 1895.

Application filed May 17, 1894. Serial No. 511,519. (No model.)

*To all whom it may concern:*

Be it known that I, ELIJAH B. BENHAM, a citizen of the United States, residing at Mystic, in the county of New London and State of Connecticut, have invented new and useful Improvements in Designing-Engines, of which the following is a specification.

This invention relates to improvements in automatically controlled designing apparatus, of the class which comprises a holder for supporting the work to be operated upon, a machine for operating on the work, and a carrier for one of these contrivances which may move the work relative to the machine, or vice versa, together with means for controlling the movements of the carrier.

The invention is applicable to designing-machines for various kinds of work. For instance, the work may be a quilt, or like fabric, to be quilted or embroidered and the machine may be a stitching machine. The work might be sheet material as paper and the machine a perforating mechanism whereby the figure might consist in a series of perforations, a perforated pattern for stamping being comprised in the product, while, again, the work might consist in a plate, or panel and the machine comprise a mill, router, or carving or chasing tool to work over the surface of the plate, panel, &c.

The object of the invention is to control the movements of the machine relative to the work, of the work relative to the machine, or of both the machine and work relative to each other, whereby the pattern may be produced through the agency of a fluid, as water, as impelled by an engine, or engines governed by a pattern-chain, or pattern-cams, the displaced water acting in determinate extents against pistons, which, through suitable mediums of connection, control the machine or work, one or both; and the invention consists, in part, in certain combinations of cylinders, or tubes and pistons therein, a carrier or carriers for the work or machine, one or both, mediums of connection between the pistons and the carriers and means for effecting determinate strokes of the piston; in part in a novel construction of pattern-controlled engine whereby water pressures and water suctions may be established between pistons in cylinders of the engine and the pistons in the tubes which are the more immediately operative in conjunction with the carrier, or carriers; in part in means for setting the pattern cam, or chain, backward so that in the further running of the machine any desired portion of the pattern may be again gone over, or for setting the pattern cam forward so that some part of the pattern, as designed on the cam, may be skipped or omitted, and in various constructions and combinations of devices and parts, all as will hereinafter more fully appear and substantially as will be covered and comprehended in and by the claims.

Reference is to be had to the accompanying drawings, in which the present invention is fully and completely illustrated, those portions of the apparatus, or mechanism, which relate to the species of work, and the machine for operating thereon being indicated as a quilt, and a sewing, or embroidery-stitching machine.

Figure 1 is a perspective view of the work carrier and its actuating piston cylinders, or tubes, the machine and machine-carrier and the actuating piston cylinders therefor, and a duplicated multiple cylinder engine having connections with the respective piston cylinders. Fig. 2 is a plan view showing, or indicating, the work and its carrier, the machine and its carrier, and the piston tubes for the respective carriers. Fig. 3 is a side elevation of the duplicated multiple-cylinder, pattern-controlled, fluid-displacing engine. Fig. 4 is a central vertical longitudinal sectional view of said engine. Fig. 5 is an end elevation of the engine. Fig. 5ª is a perspective view of a connecting-rod which unites a piston and a shiftable stud. Fig. 6 is an end view of one of the multiple cylinder heads and of the pattern-operated lever, which controls the effective action of the pistons, as in one of its swung positions for effecting a pressure in one piston tube and a suction in another thereof. Fig. 7 is a vertical sectional view taken on line 7—7, Fig. 4, through one of the heads of multiple cylinders with the pattern-operated lever in the passive position indicated in the end elevation, Fig. 5. Fig. 8 is a similar sectional view to Fig. 7, but showing the pistons as in their working positions as established by reason of the changed position of the elbow lever. Fig. 9 is a vertical transverse section taken on line 9—9, Fig. 4. Figs. 9$^a$ and 9$^b$ are perspective views of detail parts which are applied in the water chamber seen in Fig. 9, and which serve to divide said chamber into pressure and suction, or exhaust compartments. Fig. 10 is a similar vertical cross section, it however indicating the cylinder head and its centrally applied supporting shaft, as passed through an eighth of a rotation. Fig. 11 is a sectional view similar to Fig. 10, but showing a modification in the character of the pattern-cam,—this view furthermore indicating that by reason of a depression in the pattern,—instead of a protuberance as seen in Fig. 10,—in operative relation to the piston-controlling elbow-lever, the engine is working reversely of its action under the conditions indicated in Fig. 10. Figs. 12 and 13 are vertical longitudinal sections through the piston tubes for one of the carriers, these two views showing the pistons at the extremes of their reversed positions. Fig. 14 is a vertical cross section on line 14—14, Fig. 13. Fig. 15 is a transverse sectional elevation as seen on line 15—15, Fig. 3, particularly showing the gearing for setting back or forward the pattern-chain or cam. Fig. 15$^a$ is a face view of differential gearing comprised in said last mentioned mechanism. Fig. 16 is substantially a vertical longitudinal section of said mechanism as taken on line 16—16, Fig. 15. Figs. 17 and 18 are perspective views of differential gears, and of a worm-wheel and yoke, or oscillating block, to be hereinafter more particularly referred to.

Similar characters of reference indicate corresponding parts in all of the views.

In the drawings, A represents the working machine,—a sewing machine,—which has a very much elongated goose-neck and bed to afford ample space for the entrance of the work between the presser foot and throat plate. The machine rests on the elongated bed, 25, and this bed has the hanger-brackets, 26, 26, with rollers, 27, so that the machine may be moved transversely as it is constrained to do, on the parallel tracks, 28, 28, on the platform, 29, which is raised above the floor.

B represents the carrier for the work which in the illustrated example consists in a rectangular frame supported by corner posts, or uprights, 30, from the lower frame, 32, which has the grooved rollers, 33, 33, that run along the parallel floor tracks, 34, 34, at right angles to the tracks, 28, 28, for the bed, 25, which may be regarded as the machine carrier.

The quilt, or analogous fabric, may be held in a flat, taut, or stretched condition within the carrier frame by hooks, or other adequate devices.

The driving pulley, 35, of the machine is belted to the pulley, 36, carried thereby, which has a sliding spline-engagement with the power shaft, 37, which is mounted parallel with the tracks, 28, 28, for the machine carrier.

It will be apparent that the proper rectilinear motions of the machine given relative to the work-carrier, of the work-carrier relative to the machine-carrier, and compounds of the two movements will cause the needle to describe a course over and relative to the fabric in rectilinear and curvilinear lines as required to correspond to the desired pattern.

The mechanisms immediately arranged for moving the sewing machine in one direction and the quilt-frame, or work-carrier in the other, are of the same construction, and one of these mechanisms is arranged on the platform, 29, and the other on the floor under the platform. Each of these mechanisms comprises a pair of cylinders, or "tubes," $b$, $b$, as they will be uniformly designated throughout the description to avoid confusion which might arise by reference hereinafter to the cylinders of the engine which operate the mechanisms here in description. These tubes of each pair are arranged one above the other and they range longitudinally in directions respectively parallel with the tracks for the carriers which they actuate. Each tube is closed at one end and open at its other, and each is slotted through its opposite sides for half of its length toward the open end as seen at 40, 40. The paired slots for each of the tubes are, as plainly indicated in Fig. 1, within reversely arranged longitudinal portions of the pair of tubes.

The pipes, $x$, $x$, enter the closed ends of the tubes, $b$, $b$, for conveying thereinto the fluid for action against the pistons, $d$, $d$, which have their reciprocatory movements within the closed and unslotted halves of the lengths of the tubes. Each piston has the long piston rod, 42, lying within the slotted half of the tube and the piston-rods have, each, the opposite laterally extended studs, 43, 43, which project through the side slots, 40.

The distant and reversely extended extremities of the piston-rod having the said lateral studs are united by the bars, $f, f$, which extend alongside, and outside of, the tubes and while these bars, on the one hand, serve to tie the two pistons, $d$, $d$, together so that they must have their movements in unison,—one on pressure and the other exhaust,—they also serve as supports on which are journaled the sheaves, 44, 44.

The bands, 45, are passed around opposite pairs of said sheaves each with one portion thereof confined to a stationary part while a running part of each band is connected to the carrier for the machine, or work, as the case may be.

The pistons having their movements to carry the sheaves bodily along the sides of the tubes insure upon a given extent of piston-stroke a travel of the running part of the band, and of the carrier secured thereto at 41, double that of the stroke, this result being dependent on the principle that a part running peripherally over a rolling disk has a bodily movement in the direction that the disk rolls double the distance covered by the disk. Therefore, as seen in Figs. 12 and 13, the movement of the piston from near the center of the tube to near the pipe connected end of the tube causes the connection, 41, to travel twice the distance covered by the piston and sheaves. These tubes $b, b$, between the suitably packed ends of the pistons and their pipe-connected ends are kept full of water or other fluid, and the pipes, $x$, extend from the ends of the tubes to separated compartments comprised in the engine which is of a special and novel construction and capable of reversing the flow of the liquid so that it may at once be forced into the one tube of a pair and drawn out from the other and vice versa as the operation of the apparatus proceeds.

The engine is duplicated so that one department thereof operatively controls the displacement of the liquid in the piston tubes for the machine-carrier, while the other controls the displacement of the liquid in the other set of piston tubes for imparting the reciprocatory movements to the work-carrier in lines at right angles to those traversed by the machine-carrier.

The duplicated engines are indicated at D, $D^2$, especially in Figs. 1, 3, and 4, the pipes, $x, x$, in pairs being seen as extending from the engines to the piston tubes, $b$, the pairs of which are arranged at right angles to each other.

One shaft, E, is common to, and carries, the multiple cylinder head, F, of both engines, and the power is imparted to the shaft, E, through the pulley, $E^2$, by a suitably applied belt. The engines being both alike the description of the one will suffice; and the detailed description of the engine will be now given.

The head, F, which comprises the radial multiple cylinders, $g, g$, is centrally affixed upon the end portion of the shaft, E. The shaft has four longitudinal holes, or passages, within a portion of its length, which are seen at 50, in the drawings. These longitudinal passages have radial ports, 52, coincident with the axes of the several cylinders, $g$, of the cylinder head and open into the chambers within the cylinders. The pistons, $h$, play longitudinally within the cylinders, $g$, their outer extremities extending through and beyond the open outer ends of the cylinders.

Outside of, and slightly beyond, the end face of the cylinder head is an elbow lever, $i$, the vertically arranged arm, 54, of which is pivotally connected to the lug, 56, the connecting pivot being indicated by 55. The horizontal arm, 57, of this lever carries the roller, 58, which receives the impingement of the chain, or pattern-cam, $j$, which has a travel given thereto around the pulley, $j^2$.

The pattern-cam or chain will have protuberances and depressions and intermediate "dead" places thereon so that the stud, $m$, which is carried at the elbow of the elbow-lever, $i$, may have its position either exactly coincident axially with the cylinder-head shaft, E, or be thrown forward or rearward of such axis, all according as to whether the roller, 58, rests upon a dead place of the pattern chain, or upon a protuberance, or within a portion depressed below the "pitch-line" or dead surface.

The several pistons, $h$, have at their outer ends the studs, 62, with which are connected the rods, or bars, 63, 63, a detail view of one of which is shown in the perspective view, Fig. $5^a$. The inner ends of these rods, 63, have the arc-formed feet, 64, with the flanges, 65, to severally encircle the aforesaid elbow-lever stud, $m$, being retained in their engagement therewith by means of the split strap, 66.

Now, assume, for instance, that a dead part of the pattern-cam, $j$, has its position against the elbow-lever roller, 58 whereby the stud, $m$, remains coincident with the axis of the cylinder-head shaft, E. This assures, as seen in Figs. 5 and 7, a disposition by reason of the connecting rod, 63, 63, of all of the pistons, $h, h$, equidistant from the said shaft axis. Now, therefore, as the shaft and cylinder-head rotate as one, the pistons, $h$, and their connecting-rods, 63, all revolve around the stud, $m$, without any effect to displace the water which it is understood fills all of the cylinders within the pistons and the passages and compartments connected to and intervening between the cylinder chambers and the aforesaid piston tubes, $b, b$. Now, for a second example, we will assume that a prominent part of the pattern-chain, or cam, lifts the roller-carrying-arm of the elbow-lever, $i$, and so swings said lever as to carry the stud, $m$, to the rear and eccentric to the axis of the cylinder-head-shaft, E, as seen in Figs. 6 and 8. Now, as the motor-head rotates and the pistons revolve therewith those pistons which are at one side of the head successively have relative to the lengths of the cylinders outward movements for suction. When coming to the opposite position they have a reversed stroke for pressure; and while in Figs. 6 and 8 those pistons which have radial positions corresponding to the arrows above the horizontal lines intersecting the shaft, E, are effecting a suction action and the pistons as they successively assume radial positions at the other side of said line effect the pressure upon the liquid next within their ends, the reverse of these conditions is indicated in Fig. 11 wherein it is understood and indicated that the elbow-lever roller rests in a depression below the dead line of the cam and so now the cylinders which have their positions above the level of the axis are forcing the liquid inwardly, the opposite pistons now working on suction.

Of course it is understood that every piston has a pressure and exhaust action during each rotation of the cylinder-head when the stud, m, is carried into an eccentric position, either forward or rearward, as before explained.

This designing engine is so constructed, that the pistons may all have successively the action to force the water through the one pipe, x, when they are following their path above the level of shaft, E, and then to exhaust, through the other pipe, when they are following that portion of their path which is below the axis of shaft, E, when the stud, m, is swung forward of the shaft axis, (as seen, for instance, in Fig. 11,) the engine having on the other hand, reversed pressure and suction when the stud, m, is thrown rearwardly; in part by reason of the construction, relative arrangement, and connection of the radial cylinders, piston rods and shiftable common stud, m, for the inner ends of the pistons, and in part by reason of the provision of divided chambers, or double conduits from which the connecting pipes, x, x, respectively lead to the opposite ends of a pair of the piston tubes, b, b, and of the provision of ports which afford open communication from pairs of the cylinders and the shaft passages, 50, 50, into said divided compartments.

The aforementioned divided compartments, or double conduits, 81, 85, as they may in a sense be regarded, are comprised within the casing, G. The division or separation of the one portion of the space within this casing from the other portion will be shortly described.

Now, from the drawings it is seen that the shaft, E, has the radial ports, 70, at its portion which is embraced within the casing, G, and the radial lines of which ports, 70, correspond with the radial ports, 52, which latter are axially coincident with the cylinders, g. Therefore, for instance, when a cylinder is vertical, or at any inclination, the port, 70, in communication with that cylinder, is correspondingly vertical, or at the same inclination.

The split and hinge-united ring, n, surrounds, but does not rotate with, the shaft, E, at its portion which comprises the ports, 70. The design, or detailed construction of this ring is shown in Fig. 9ª, especially, and is seen to consist of the two semi-annular halves, or sections hinge-jointed at 72, and provided at the opposite extremities of the sections with the lugs, 73, through perforations of which the bolt, 74, is transversely passed. The spring, 75, applied between one of the lugs and the nut, or shoulder on the bolt, causes the sections to have a contraction so that the internal arc-faced ribs, 77, may bear closely peripherally against the opposite sides of the shaft, E. The said ribs, 77, have approximately the width of the ports, 70, and serve as cut-offs for the ports leading to opposite cylinders which are at the ends of their strokes. This contractible ring, n, has the apertures, 80, 80, and has its inner upper surface clear from the shaft, E, so that one or more often two of the ports, 70, will, in whole or part, be uncovered to permit the passage out from the ports into the chamber in casing, G, if the piston cylinders corresponding to these ports are working on pressure, or if working on exhaust the flow of the liquid will be from the casing chamber to and through the ports, 70. The said ring, n, has its lower half apertured as seen at 82, within which is closely fitted the arc-formed upper portion, 83, of a tubular stem, 84, the tube passage upwardly terminating in the flaring mouth, 85, which constitutes the second chamber within, and separated from, the main chamber of the casing, G. The tubular stem, 84, of this part sits down within the vertical hole therefor in the base standard 88, for casing, G, and this tubular stem has connection, or communication with one of the pipes, x, which may, as already understood, alternately supply pressure to and exhaust the liquid from one of the pair of piston tubes, b. By reason of the faces, 89, 89, closely fitting against the bottoms of the ribs, 77, of the apertured ring, n, the communication between the upper chamber and the lower chamber, or flaring mouth, 85, is effectually prevented and the ring is also thereby prevented from having any rotational movement relative to the shaft E. Thus, briefly, in the arrangement illustrated, any of the pistons h, which are above a horizontal plane which is coincident with the shaft, E, and working on pressure will displace the water from their cylinders through the upper compartment, 81, and the pipe connected therewith, to, and into, the piston-tube at the terminal of such pipe,—while the pistons below such horizontal plane are exhausting at a corresponding rapidity the pressure from the other tube, b, the water thence passing from the pipe, x, connected to the second tube, b, through the lower divisional chamber, 85, and the shaft ports and passages into the chambers of the piston cylinders which are having the reverse,—that is the exhaust, action; and then, of course, on the sufficient change of the pattern-cam the lower ones become pressure-pistons and the upper ones exhaust. There is in this engine, of course, no new supply of liquid given into the cylinders and conduits and compartments, but the same liquid is permanently used as a medium of transmission of force between the cylinder pistons and the tube pistons in reverse directions as the controlling mechanism may determine, the primary actuating power being imparted through the shaft and pulley, E, E$^2$; and while in the detailed description particular forms and constructions of parts for insuring the divisional chambers and cut-off of the ports, 70, have been specified, obviously the invention so far as this department thereof is concerned is not to be limited to the devices exactly as specified.

In Fig. 11, a position of the head of radial cylinders is shown in which the four cylinders stand at angles of forty-five degrees, at which instant two of the ports, 70, are permitting pressure outwardly therefrom to pass to the upper pipe, x, while two of the other ports are in open communication with the lower pipe, x, for the suction. In this view the lever is so swung that the stud, m, is at the opposite side of the axis of shaft, E, from that seen in Fig. 10, so that the reversed suction and exhaust from what is there established is now effected, for the reversed actuating movements of the tube pistons, b, b; and in this view, it is furthermore designed to illustrate the possibility of substituting a cam-ring which also comprises an internal gear for the cam pattern-chain. In this case the pattern-driving wheel, $j^2$, is peripherally toothed.

In order that the pattern-cam, or chain, may be slowly driven as the work of the engine proceeds, or that it may be quickly set forward, or rearward, in any desired extent while the engine is running, I provide a mechanism which normally assures a slow progressive movement of the pattern, but which by a proper hand manipulation may, as it were, ignore the "back gearing" or slow driving mechanism, and be directly and more rapidly moved, and this peculiar mechanism will be now described.

On the counter-shaft, J, carrying the pattern wheel, $j^2$, is fixed a disk with an annular, or internal, gear, 90. Surrounding this shaft is a sleeve, 92, having thereon the eccentric, 93. The sleeve is driven very slowly from the main shaft, E, of the engine, thus:—On the end of the eccentric-carrying sleeve, opposite the eccentric, is a large spur-gear, 94, meshing with which is the pinion, 95, on the intermediate shaft, 96, which shaft also has the larger spur gear, 97, which, in turn, is in mesh with the gear or pinion, 98, on the main shaft, E.

Concentrically surrounding the eccentric and loosely fitted thereon is the spur gear, 100, of somewhat smaller diameter than the internal gear. The spur gear is normally held from rotation by having on its sides the lugs, 102, 102, which enter the aligned slide-ways, 103, 103, in the slide-block, or yoke, u, which has the elongated rectangular hole, 104, at its center through which protrudes the square hub, 105, of the worm-gear-wheel, v, which gear and hub are loosely mounted on the eccentric-carrying-sleeve, 92. On the short shaft, 106, mounted at right angles to pattern-wheel shaft, J, in a suitable fixed journal, or bracket, is the worm, w, which is in worm-engagement with the worm-gear-wheel, and the said shaft, 106, has the hand-wheel, 107, for conveniently turning the worm. Now it will be explained that the rotation of the eccentric-sleeve, through the eccentric, imparts an oscillatory, or eccentric movement to the spur gear which latter cannot have any rotational movement, because of the engagement of the lugs in the ways, 103, of block, u, which, in turn, may slide, but not rotate, (except on occasion, as purposely performed through the hand-wheel and worm-gearing.) It will require a number of rotations of the eccentric sleeve, and revolutions of the spur gear (which movement is without rotation) to insure one complete rotation of the internal gear and pattern-wheel-shaft, equal to the number of times that the difference between the number of the teeth of the spur-gear and internal one is contained in the number of the teeth in the internal gear. This may be explained as dependent on the demonstrable fact that when a spur gear having a given number of teeth is given an eccentric motion and is held against rotation, and is roving around on the teeth of an internal gear having a greater number of teeth, such spur gear, in order to make its circuit bodily without rotation on the internal gear and without impediment by such gear, must, necessarily, force, or pry, the internal gear around in an extent corresponding to the difference between the number of teeth of the spur and internal gears. So, for instance, if there be fifty teeth in the internal and forty on the spur gear, it will require five revolutions of the spur gear to turn the internal gear once around; but, now, on the other hand, supposing it is desired to quickly turn the pattern-wheel-shaft, J,—to set forward, or back, the pattern and the hand-wheel is turned,—the worm-wheel and its slide-block are rotated and a rotational movement imparted to the spur-gear, 100, which, rotating on the eccentric, insures so great a portion of a rotation of the internal gear and pattern-shaft as the number of teeth of the spur gear is fractional of those of the internal gear; that is on the same assumption of forty teeth to fifty, an actual rotation of the spur gear, by manipulation of the hand-wheel, accomplishes four-fifths of a rotation of the internal gear and the pattern-wheel-shaft.

Having thus described my invention, what I claim, and desire to secure by Letters Patent, is—

1. In a designing apparatus, the combination with a working machine, and a work-holder, and a carrier for moving one of the said parts relative to the other, of a tube and a piston therein, and a medium of connection between the piston and the carrier, an engine, for forcing and withdrawing the fluid into and from the said tube, which is capable of variable lengths of fluid forcing strokes, and automatic mechanism for controlling the action of said engine, whereby, according to the operation of the latter the strokes of the said piston and the movements of the carrier may be governed, substantially as described.

2. In a designing apparatus, the combination with a work-holder, and a machine for operating on the work carried by the holder, and a carrier for moving one of said parts relative to the other, of a pair of parallel tubes each with a longitudinal slot through its side for a portion of its length, the slots being within reversely arranged longitudinal portions of the tubes, pistons within the unslotted portions of the cylinders having piston-rods extending along within the slotted portions of the tubes, which are provided with lateral projections extending through said slots, a bar connecting said projections, and mediums of connection between the so-tied pistons and the aforesaid carrier, and apparatus for controlling and reversing the flow of the operating fluid back of the said pistons, substantially as described.

3. In a designing apparatus, the combination with a working machine and a work-holder, a carrier for the machine constrained for reciprocatory movements, and a carrier for the work-holder constrained for reciprocatory movements in lines which are angular to the paths of the machine-carrier, tubes with pistons for said carriers with mediums of connection between the pistons and carriers, of an engine for forcing and withdrawing a fluid into and from the piston-tubes and automatically regulating devices for controlling the mechanism which is comprised in the engine for controlling the forward and reversed flow therein of the operating fluid whereby the strokes of the pistons and movements of the carriers in determinate and varying degrees may be insured, substantially as described.

4. In a designing apparatus, the combination with the working machine and the carriage and tracks on which the machine carriage runs, and a work-holder and a carriage therefor running in a path angular to those of the machine, a pair of tubes for the machine-carriage, and a pair for the work-holder carriage with pistons therein, uniting devices between pairs of the pistons, mediums of connection between the uniting devices and the respective carriages, and apparatus for controlling the fluid pressure for action upon the various pistons, substantially as described.

5. In a designing apparatus, the combination with a work-holder, a machine for operating on the work carried by the holder, and a carrier for moving one of said parts relative to the other, of a pair of parallel tubes each with a longitudinal slot through its side for a portion of its length, the slots for the different cylinders being within reversely arranged longitudinal portions thereof, pistons within the unslotted portions of the tubes having piston-rods with lateral projections extending through said slots, bars connecting said projections and sheaves journaled on said bars, a band around the pair of sheaves with one portion thereof confined to a stationary part, a running part of the band being connected to the aforesaid carrier, substantially as and for the purpose described.

6. In a designing engine, the combination with a rotary head comprising a series of radial piston-cylinders opening inwardly to successive communication with opposite pressure and exhaust conduits, and the pistons within said cylinders which extend through the outer ends of the cylinders, of a lever outside of the cylinder-head carrying a stud having its center normally coincident with the common center of the cylinder-head to which the piston-axes all converge, a pattern-chain or cam, operating relative to an arm of the lever for throwing said stud off eccentric to said common center, and rods connecting all of said pistons to said shiftable stud, substantially as described.

7. In a designing engine, the combination with the rotary multiple cylinder-head with pistons reciprocating therein, a shaft with which said head rotates having a series of separate longitudinal passages with radial ports opening to the inner ends of the cylinders, a divisional compartment within which said shaft enters, the chambers of which are connected with pressure and exhaust conduits, ports leading radially of the shaft from the longitudinal passages and successively passing as the shaft turns to communication with the pressure and exhaust chambers and conduits, of the shiftable stud, the rods connecting the pistons with said shiftable stud and pattern-controlled means for effecting the shifting of the said stud, substantially as described.

8. In a designing engine, the combination with a rotary head comprising a series of radial piston cylinders opening inwardly and the pistons within said cylinders which extend through the outer ends of the cylinders, of a pivotally mounted elbow-lever outside of the cylinder-head carrying a stud having its center normally coincident with the common center of the cylinder-head to which the piston-axes all converge, a continuously driven wheel near an arm of said elbow-lever and a pattern chain or cam running around said wheel and operating relative to an arm of the lever for throwing said stud off eccentric to the aforesaid common center, and rods connecting all of said pistons to said shiftable stud, substantially as and for the purpose set forth.

9. In a designing engine, the combination with the shaft, E, having the head of radial multiple cylinders, a common shiftable stud which may have a position coincident with, or eccentric to, the axis of the shaft, the pistons in the cylinders which are connected to said shiftable stud, and said shaft having passages longitudinally within it, from different portions of the length of which passages are the radial ports, 52, 70, the former opening into the piston cylinders, and divided compartments into which the ports, 70, communicate, the tubes, b, b, having the reversely arranged pistons therein and the pipes, x, x, extending from said divided compartments into the ends of said tubes, substantially as described.

10. In a designing machine, in combination with the shaft, E, having the longitudinal passages, 50, and corresponding radial ports, 52 and 70, having the multiple cylinder-head with pistons, and the common shiftable support with which said pistons are respectively connected, the casing, G, surrounding the portion of the shaft having the ports, 70, the ring, n, within this casing having the internal ribs, 77,—which peripherally bear upon the opposite sides of the shaft and serve as cut-offs,—and also having the aperture, 82, in its bottom, the tubular stem, 84, having the head, with the flaring opening, which bears against the under side of the shaft and constitutes a divisional compartment from the main chamber of said casing, the piston tubes, b, b, and the pipes, x, x, the one connecting the main compartment with a tube, b, and the other affording communication between said tubular stem and a tube, b, substantially as and for the purpose set forth.

11. In a designing engine of the character described, the combination with the casing, G, comprising the double compartments, 81 and 85, of the shaft, E, having within said casing the radial ports, 70, 70, and the stationary ring, n, surrounding the shaft and comprising the two sections, spring-pressed together, each having the internal rib, 77, bearing peripherally on the shaft at its port-provided portion and each having the opening, 80, and said ring having the opening, 82, substantially as described.

12. In a designing engine of the character described, the combination with the casing, G, having the divisional compartments, and the port-provided shaft, E, of the ring, n, consisting of two semi-annular sections hinge-united at their lower ends, and having the perforated lugs, 73, at their other ends and each provided with the internal rib, 77, and aperture, 80, and said so-formed ring having the aperture, 82, at its bottom, the bolt passed through the perforated lug having the shoulder, 76, and the spring surrounding the bolt and serving to contract the jointed ring, substantially as described.

13. In a designing engine, the combination with the pattern-wheel-shaft carrying the internal gear, of the sleeve surrounding said shaft and carrying the eccentric, a train of reducing gears between the main shaft of the engine and said sleeve, a spur-gear loosely mounted upon the eccentric and having the lugs extended from its face, the worm-wheel loosely mounted upon the sleeve alongside said spur-gear and having the squared hub, the oscillating block having the oblong opening through which said squared hub protrudes and having the slide-ways at right angles to the length of said opening within which engage the lugs of the spur-gear, the worm, or screw, suitably mounted and in engagement with the worm-wheel and having means for conveniently turning it, all substantially as described and shown.

14. A designing engine comprising the piston-tubes, b, b, and the heads of radial cylinders, pistons therein, the shiftable common stud, m, and the connecting rods secured to the respective pistons and converging to, and having connection with, said stud, m, divided chambers, and the connecting pipes which respectively lead therefrom to the opposite ends of said piston-tubes, and a rotatable shaft having ports which, as the shaft rotates, are in communication with the cylinders for said pistons, and which ports are successively brought to open communication with both of said divided chambers, substantially as described.

15. In a designing apparatus, the combination with the machine and carrier, tracks for the carrier and piston-tubes arranged parallel with said tracks having pistons therein which are operatively connected with the machine-carrier, of the work-holder and its carrier and tracks for said carrier arranged at right angles to the machine-carrier-tracks and a pair of piston-tubes arranged parallel with said last-named tracks, the pistons of which are operatively connected to said work-carrier, duplicated engines each having a rotary head, or set, of radial piston-cylinders opening inwardly to successive communication with opposite pressure and exhaust conduits which extend, respectively to said piston-tubes, pistons within and extending through the outer ends of the cylinders, a shiftable stud outside of each cylinder-head and rods connected, respectively, to the pistons and all having connection with said stud, and pattern-actuated mechanism for automatically shifting the positions of said studs for varying the degree of the suction and exhaust action of the coacting sets of pistons and cylinders and for reversing the suction and exhaust actions thereof, substantially as described.

16. In a designing apparatus, the combination with the machine and carrier, tracks for the carrier and piston-tubes arranged parallel with said tracks having pistons therein which are operatively connected with the machine-carrier, of the work-holder and its carrier and tracks for said carrier arranged at right angles to the machine-carrier-tracks and a pair of piston-tubes arranged parallel with said last-named tracks, the pistons of which are operatively connected to said work-carrier, duplicated engines each having a rotary head or set of radial piston-cylinders opening inwardly to successive communication with opposite pressure and exhaust conduits which extend, respectively to said piston-tubes, pistons within, and which extend through the outer ends of, the cylinders, an elbow-lever mounted outside of each head of cylinders having at its elbow the stud, m, the piston-rods connected to the outer ends of the pistons and all having connection with said stud, m, pattern-cams, or chains, respectively working against the free arm of each of said elbow-levers for swinging said levers and changing the position of said studs and thereby changing the eccentric arrangement of the sets of pistons relative to the center of rotation of the heads of cylinders, substantially as described.

17. In a designing apparatus, the combination with a work-holder, a machine for operating on the work carried by the holder, and a carrier for moving one of said parts relative to the other, of a pair of parallel tubes each with longitudinal slots through its opposite sides for a portion of its length, the paired slots for the different cylinders being within reversely arranged longitudinal portions of said tubes, pistons within the closed and unslotted portions of the tubes having piston-rods with lateral projections extending oppositely through said slots, bars connected to the studs of both piston rods, pairs of sheaves journaled on said bars at the opposite sides of the tubes, bands around opposite pairs of said sheaves each with one portion thereof confined to a stationary part while a running part of each band is connected to the aforesaid carrier, and an apparatus for controlling the supply of pressure fluid to, and the exhaust thereof from, said paired tubes, substantially as described.

ELIJAH B. BENHAM.

Witnesses:
WM. S. BELLOWS,
J. D. GARFIELD.